May 10, 1966  B. M. WALL  3,250,829
METHOD OF MAKING A COMBUSTION-INHIBITED
SOLID PROPELLANT GRAIN
Filed March 18, 1963  4 Sheets-Sheet 1

INVENTOR.
Bobby M. Wall
BY
Curtis, Morris & Safford
ATTORNEYS

May 10, 1966
B. M. WALL
3,250,829
METHOD OF MAKING A COMBUSTION-INHIBITED
SOLID PROPELLANT GRAIN
Filed March 18, 1963
4 Sheets-Sheet 2
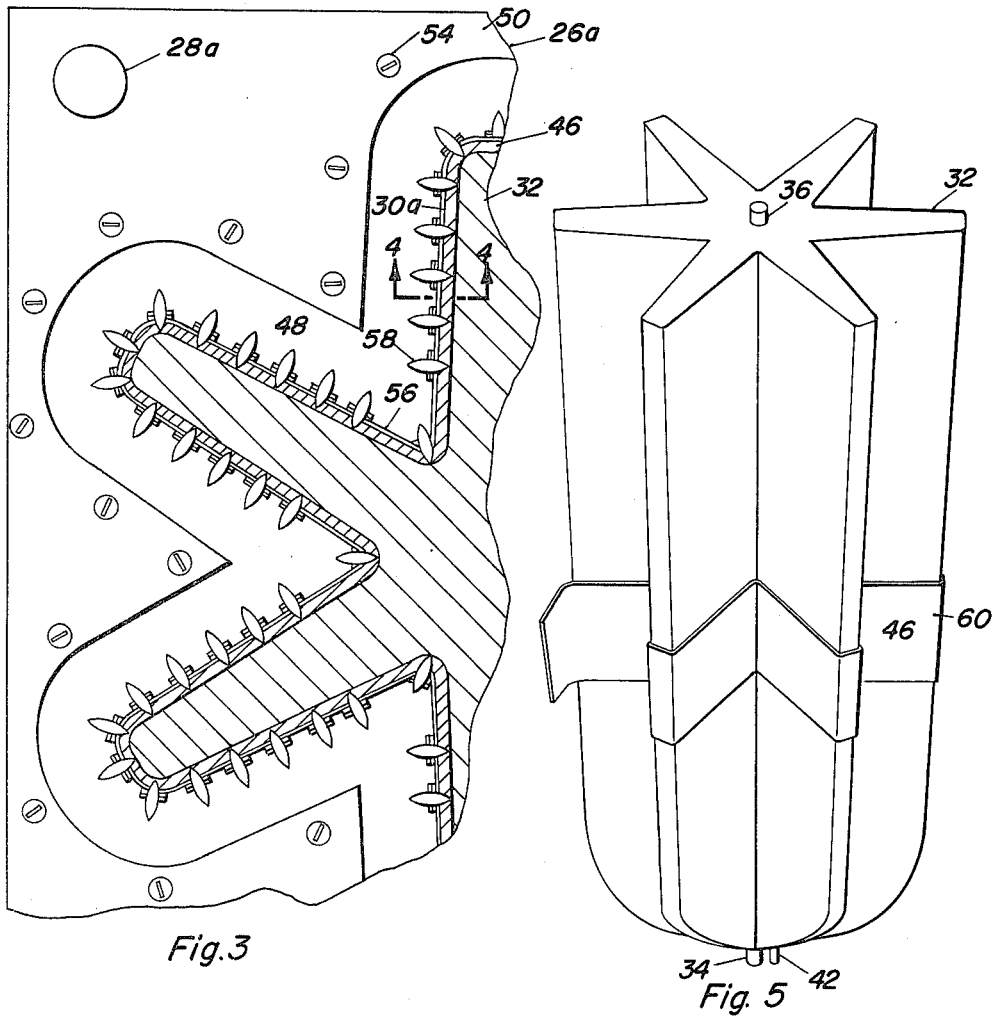
Fig. 3
Fig. 5
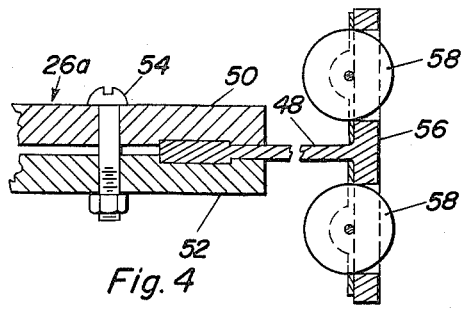
Fig. 4
INVENTOR.
Bobby M. Wall
BY
Curtis, Morris & Safford
ATTORNEYS May 10, 1966  B. M. WALL  3,250,829
METHOD OF MAKING A COMBUSTION-INHIBITED
SOLID PROPELLANT GRAIN
Filed March 18, 1963  4 Sheets-Sheet 4

INVENTOR.
Bobby M. Wall
BY
Curtis, Morris & Safford
ATTORNEYS

United States Patent Office 3,250,829
Patented May 10, 1966

3,250,829
METHOD OF MAKING A COMBUSTION-
INHIBITED SOLID PROPELLANT GRAIN
Bobby M. Wall, Brigham City, Utah, assignor to Thiokol
Chemical Corporation, Bristol, Pa., a corporation of
Delaware
Filed Mar. 18, 1963, Ser. No. 265,790
3 Claims. (Cl. 264—3)

This invention relates to controlling rocket motors of the type using a solid propellant and more particularly to controlling the pressure produced by a solid propellant at the time of ignition by applying a combustion-inhibiting composition to certain portions of the ignition surface of the propellant charge.

The typical solid propellant rocket motor comprises a thin-walled high-strength case, containing a propellant charge having a central combustion chamber therein. High performance rocket engines operate at high internal pressures and are designed for minimum weight such that the operating pressure induces stresses into the pressure vessel wall which approach the yield strength thereof. A characteristic of solid propellant rocket motors with conventional ignition means is that, upon ignition, the internal pressure builds up in a fraction of a second to a pressure peak which is substantially above the operating pressure for which the motor is designed. This peak could induce stresses in the vessel wall that could exceed the strength of the wall material. Hence, it has been necessary to devise a means for eliminating the initial pressure peak, or reducing it to a practical level such that the pressure vessel is not damaged, although efficiency necessitates that the pressure build up as rapidly as possible. One method of controlling an ignition pressure peak is to apply a combustion-inhibiting substance to the ignition surface of the propellant charge. This substance is typically a mastic elastomeric sealant having a burning rate slower than that of the propellant. It has been applied to those portions of the ignition surface of the propellant charge which have been accessible to manual application, i.e., the surfaces near the aft end of the propellant charge, limited by the distance a man can reach. The inhibiting material used is formulated so as to cure and bond to the propellant surface at ambient temperature.

Although the process practiced in this manner reduces the ignition pressure peak to some extent, neither the application of the material nor the rocket motor performance are reproducible. It is very difficult to control the thickness of the combustion-inhibiting composition as it is applied in this manner, and control of the thickness is essential for predictable performance of the rocket motor. Also, a wax release agent is commonly used on the mandrel that molds the combustion chamber in a solid propellant charge as it solidifies; and, before the combustion inhibiting composition can be applied to a surface formed in this manner, the wax must be removed by scraping it from the propellant. This scraping can produce a roughened surface on the propellant which upon ignition could greatly add to the pressure buildup in the rocket motor. Also, it is theorized that one reason for the pressure buildup in the rocket engine is that the gases from the ignition device, striking the propellant surface at high velocity, tend to tear off small pieces of the propellant in an erosive manner which greatly increases the burning surface of the propellant for a very short period of time. This erosive effect is greatly increased by any roughening of the propellant surface.

My invention is directed to a method of and apparatus for applying a combustion-inhibiting composition onto selected portions of the ignition surface of a solid propellant rocket charge. The method comprises applying the combustion-inhibiting composition to a mandrel by a precisely controlled shaping template, or in sheet form, and then using the mandrel to mold the ignition surface of the propellant charge around the inhibiting composition and withdrawing the mandrel when the propellant has solidified, leaving the inhibiting composition on the ignition surface.

An object of my invention is to minimize erosive burning upon ignition of the solid-propellant charge of a rocket by incorporating a smooth-surfaced combustion-inhibiting composition on the ignition surface thereof.

Another object of my invention is to control the thickness of the combustion-inhibiting composition that is applied to the ignition surface of a solid-propellant rocket charge.

Another object of my invention is to provide a method of and apparatus for applying a combustion-inhibiting composition to any desired portion of a solid propellant rocket charge.

Another object of my invention is to apply a combustion-inhibiting composition to the ignition surface of a solid-propellant rocket charge during casting that will create a very strong bond between this composition and the solid propellant and which will obviate the necessity of preparing the propellant surface in any special manner after it has solidified.

Another object of my invention is to provide a means that greatly facilitates the application of a combustion-inhibiting composition to the surface of a solid propellant rocket charge.

Other objects and advantages of my invention will become apparent as the following description is read in reference to the accompanying drawings, wherein the same parts are designated by identical characters throughout the views.

FIGURE 3 is a fragmentary view of a modified form of shaping template on the apparatus shown in FIGURE 1 to adapt it for use on noncylindrical mandrels;

FIGURE 4 is a partial sectional taken on the line 4—4 of FIGURE 3;

FIGURE 5 is a perspective view of a typical mandrel for forming the ignition surface of a solid-propellant rocket charge, showing how the combustion-inhibiting composition may be applied thereto in the form of sheets;

Figure 6:
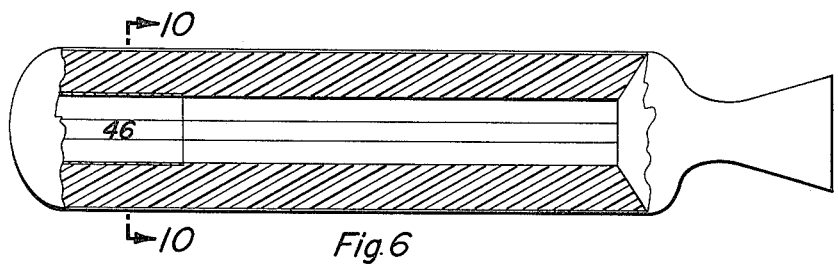
Figure 7:
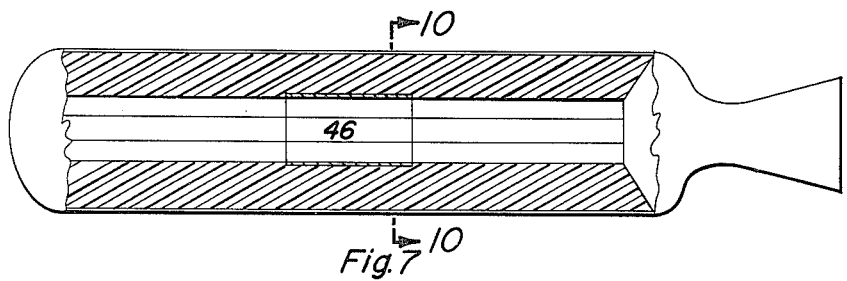
Figure 8:
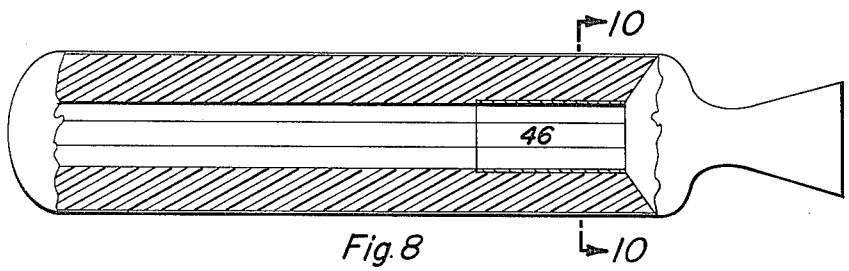
Figure 9:
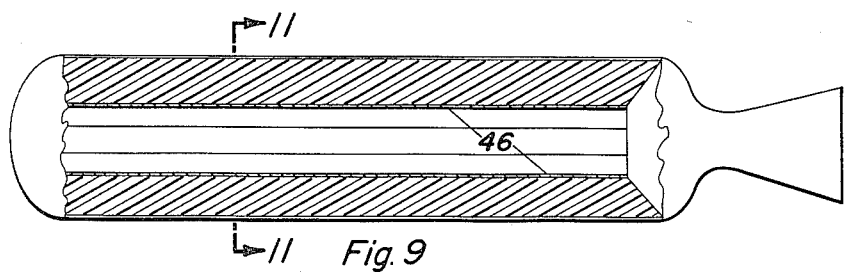
Figure 10:
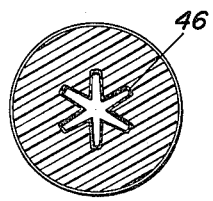
Figure 11:
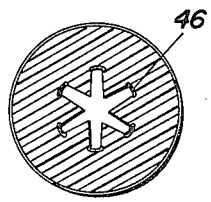

FIGURES 6, 7, 8, and 9 are sectional views of a typical solid-propellant rocket engine showing how the combustion-inhibiting composition may be incorporated into the forward-end portion, the central portion, the aft-end portion, and the "star valleys," respectively, of the ignition surface of a propellant charge;

FIGURE 10 is a cross section taken on the line 10—10 of FIGURES 6, 7, and 8;

FIGURE 11 is a cross section taken on the line 11—11 of FIGURE 9; and

Figure 12:
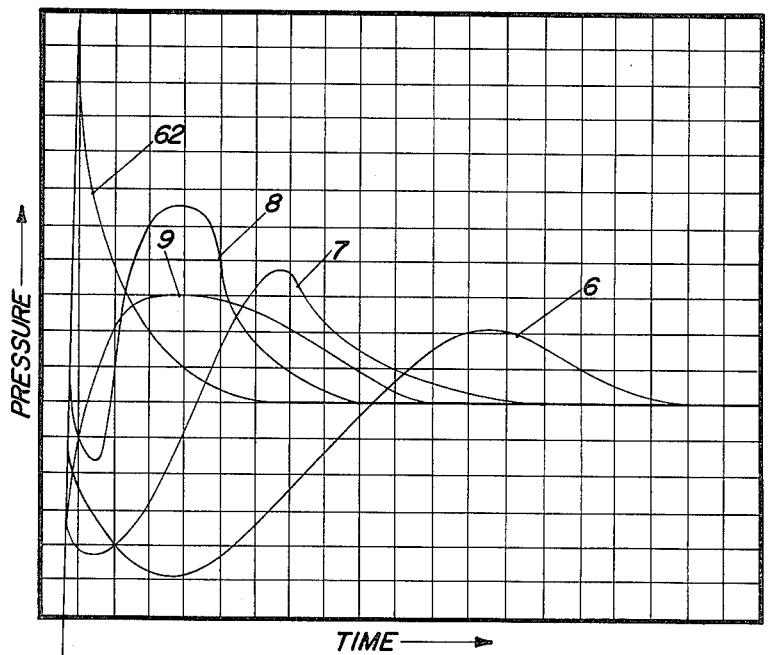

FIGURE 12 is a graph showing typical pressure v. time curves obtained upon ignition of the rocket motors shown in FIGURES 6, 7, 8, and 9, as compared with that of a rocket motor untreated with inhibiting composition.

Figures 1, 2:
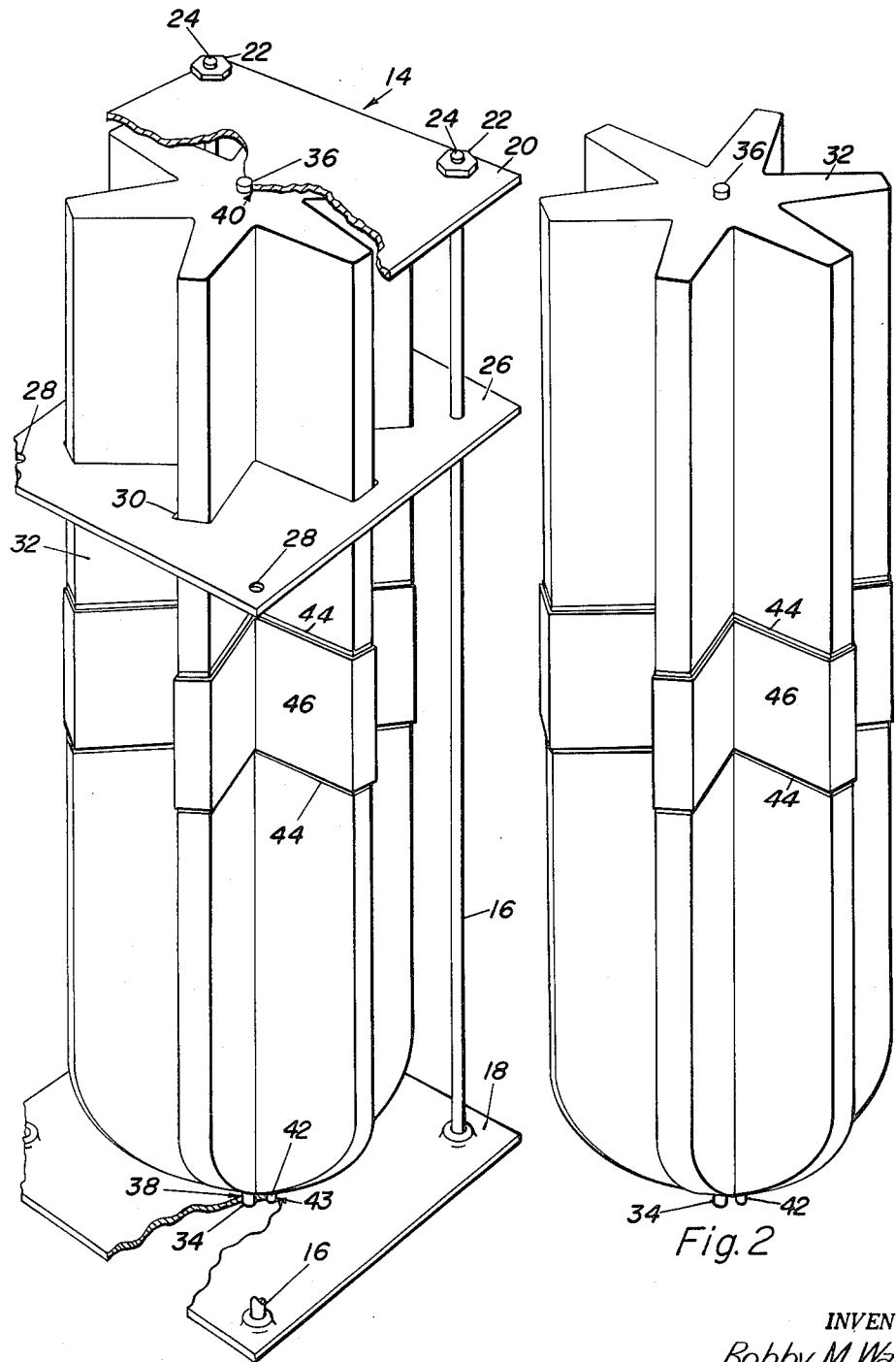
FIGURE 1 is a perspective view of an apparatus incorporating the present invention and showing how it is used to apply a combustion-inhibiting composition to the surface of a mandrel of the kind used for forming the internal cavity of a solid propellant rocket engine.
FIGURE 2 is a perspective view of such a mandrel showing the combustion-inhibiting composition thereon prior to molding an internal cavity in a solid-propellant charge.

A preferred form of apparatus 14 incorporating my invention is shown in FIGURE 1 is comprising essentially a plurality of parallel guide columns 16 fixed at one end to an end support 18 and extending through appropriately spaced holes in an end support 20 at the opposite ends of the rods. End support 20 is confined between shoulders, not shown, on guides 16 and nuts 22 screwed on the threaded end portions 24 of the guides. A shaping template 26 is mounted for sliding movement upon the guides 16 by a means of holes 28 therein through which the guide columns 16 extend. The shaping template 26 has a central aperture 30 conforming to the cross-sectional configuration of the mandrel 32 to which the combustion-inhibiting composition is to be applied. However, the aperture 30 is larger than the cross-sectional configuration of mandrel 32 to provide a uniform space between the aperture 30 and the surface of the mandrel 32 corresponding to the desired thickness of the combustion-inhibiting composition to be applied to the mandrel.

In practice, the apparatus described is assembled on the mandrel 32 to which the combustion-inhibiting composition is to be applied. To this end, a pin 34 projecting from the forward end of the mandrel 32 along the central axis thereof is fitted into a central hole 38 in the end support 18 and an index pin 42 projecting from said forward end of the mandrel near the pin 34 is fitted into an index hole 43 in the end support 18 for proper angular orientation of the mandrel 32 relative to the apparatus 14. The shaping template 26 is then fitted over and slid onto the guide columns 16. A pin 36, similar to pin 34, projecting from the rearward end of mandrel 32 is fitted into a central hole 40 in the end support 20, the threaded ends 24 of the guide columns 16 are projected through aligning holes in the end support and the nuts 22 are screwed onto the threaded ends of the guide columns to securely fasten the end support thereto and confine the mandrel firmly between the end supports 18 and 20.

The location of the combustion-inhibiting composition on the mandrel is then defined by applying masking tape 44 to the mandrel 32. The shaping template 26 is then moved to one side of the area to be coated and the inhibiting composition 46 is generously applied to that area. The shaping template 26 is then reciprocated over the combustion-inhibiting composition, scraping away the excess and leaving a smooth layer of the composition of uniform thickness upon the surface of the mandrel 32. Any excess composition extending from the area intended to be covered onto the masking tape is then removed by removing the masking tape to provide a predetermined area of the mandrel surface, only, which is covered by the composition. The mandrel 32 is then removed from the apparatus 14 and the combustion-inhibiting composition 46 upon the mandrel is subjected to a partial cure at an elevated temperature, after which the mandrel may be inserted into a rocket engine case and uncured propellant cast around it. When the propellant charge has solidified, the mandrel is withdrawn in a conventional manner, leaving the combustion-inhibiting composition integrated into the surface of the propellant over a desired portion thereof.

The combustion-inhibiting composition 46 is described above as an elastomeric sealant and such sealants commonly comprise an organic polymer and inorganic filler, with or without minor amounts of burning rate modifiers. One such specific sealant material that has been found satisfactory has the following composition:

|  | Percent |
|---|---|
| Polybutadiene acrylic acid acrylonitrile terpolymer | 46.70 |
| Carbon particles (finely divided) | 49.00 |
| Tris[1-(2-methyl)aziridinyl]phosphine oxide | 1.40 |
| Iron octoate (6%) (Ferric salt of 2-ethyl hexanoic acid in a 6% solution, or ferric-2-ethyl hexoate) | .90 |
| p-(2,3 epoxypropoxy)N,-2,-3 diepoxypropylaniline | 1.00 |
| Tri glyceride of hydroxy stearic acid | 1.00 |
|  | 100.00 |

The shaping template 26 illustrated as part of the apparatus 14 in FIGURE 1, is usable only with mandrels that are essentially cylindrical in form, i.e., having surface generated by a moving line that is always parallel to the central axis of the mandrel. FIGURE 3 illustrates a shaping template 26a which can be used with mandrels that are divergent from the forward end to the aft end thereof. In this modification of the shaping template, the aperture 30a in the template is adapted to flex from the smaller to the larger dimensions of the mandrel by means of an elastic diaphragm 48 which is tightly confined between the two laminae 50 and 52, see FIGURE 4, providing a rigid support for the structural portion of the shaping template 26a by means of the screws 54. The inner edges of the diaphragm 48 are attached to an elastic strap 56 that is maintained at a constant distance from the surface of the mandrel 32 by a plurality of spaced sharp-edged wheels 58. As shown in FIGURE 4, the wheels 58 are mounted in pairs, at opposite sides of the supporting laminae 50 and 52, in bearings that are fixed to the outer edge of the elastic strap 56. This embodiment of the shaping template may be used in identical fashion to that previously described.

FIGURE 5 illustrates an alternate method of applying the combustion-inhibiting composition 46 to the mandrel 32. In this process, the combustion-inhibiting composition is formed into sheets of the desired thickness by calendering in a conventional manner, and the sheets 60 of inhibiting composition may be applied without apparatus to the mandrel. These sheets 60 are tacky enough to adhere to the surface of the mandrel without the aid of any bonding agent. The mandrel may then be used in identical fashion to that previously described.

The effect upon rocket engine performance of the ignition surface area that has been inhibited in this manner varies considerably according to its location within the rocket motor. FIGURES 6, 7, 8 and 9 illustrate various locations of the combustion-inhibiting composition on the ignition surfaces of propellant charges that have been tested in rocket motors, and FIGURE 12 is a graph showing the resulting thrust v. time curves for each location. Curve 62 is typical of a solid propellant rocket engine in which the ignition surface is uninhibited and the undesirable initial pressure peak is clearly evident. Curve 6 resulted when the combustion-inhibiting composition was located toward the forward end of the ignition surface of the rocket motor as in FIGURE 6 and it will be observed that the initial pressure is lower than that resulting from any of the other three locations shown, but the time necessary for the motor to achieve operating pressure is greater. Curve 7 resulted when the central portion of the ignition surface was inhibited as shown in FIGURE 7 and the initial pressure peak of this curve is somewhat higher than that of curve 6, but the time necessary for the engine to achieve operating pressure is less. Curve 8 resulted when the aft-end portion of the ignition surface was inhibited as illustrated in FIGURE 8 and shows that the initial pressure peak of this curve is higher than that of the two preceding curves, but the time necessary for the engine to achieve operating pressure is much shorter. Curve 9 is considered to be optimum and shows that the rocket motor achieves its operating pressure very rapidly and that the initial pressure peak is quite low. This is the curve that results when only the "star valleys" of the ignition surface are inhibited as shown in FIGURES 9 and 11.

A method and apparatus has been described for incorporating a combustion-inhibiting composition with precision as to thickness and location within the ignition surface of a solid-propellant rocket charge. Although the description has been written with some degree of detail, it is to be understood that a considerable number of alternative means may be employed within the spirit and scope of the invention. For example, various compositions may be employed to inhibit combustion, and the apparatus described can be altered greatly and yet perform the same function in the same manner. Also, it can be seen that, by means of my invention, the performance of a rocket motor can be influenced to a considerable extent.

I claim:

1. A method of applying a combustion-inhibiting coating to at least a portion of the ignition surface of a solid propellant grain in a rocket engine to reduce the initial pressure peak produced by the burning propellant which comprises the steps of, applying the combustion inhibiting coating to the surface of a mandrel, casting the propellant around the mandrel, bonding the coating to the propellant during curing of the latter, and then withdrawing the mandrel to form an ignition surface on the grain adjacent the combustion-inhibiting coating thereon.

2. The method as defined in claim 1 wherein the said combustion-inhibiting composition is applied to said mandrel by reciprocating a template longitudinally of the mandrel to spread the composition on the surface thereof.

3. The method as defined in claim 1 wherein said combustion-inhibiting composition is applied to said mandrel by wrapping sheets of the composition on the surface of the mandrel.

References Cited by the Examiner

UNITED STATES PATENTS

| | | | |
|---|---|---|---|
| 1,308,330 | 7/1919 | Brown | 18—59 |
| 1,528,711 | 3/1925 | Verhaert | 264—278 |
| 2,257,432 | 9/1941 | Smith | 118—102 |
| 2,460,874 | 2/1949 | Coberly | 18—59 |
| 2,672,070 | 3/1954 | Forster | 264—271 |
| 2,858,289 | 10/1959 | Bohn et al. | 102—98 |
| 2,899,927 | 8/1959 | Prentice | 118—102 |
| 2,916,776 | 12/1959 | O'Neill et al. | 264—3 |
| 2,917,424 | 12/1959 | Hirsch et al. | 86—1 |
| 3,001,363 | 9/1961 | Thibodaux et al. | 264—3 |
| 3,032,437 | 5/1962 | Pitchford | 117—72 |
| 3,048,076 | 8/1962 | Capener et al. | 86—1 |
| 3,136,831 | 6/1964 | Zinn | 264—225 |

LEON D. ROSDOL, *Primary Examiner.*

M. KATZ, CARL D. QUARFORTH, *Examiners.*

L. DEWAYNE RUTLEDGE, *Assistant Examiner.*